Jan. 22, 1929. J. JENNEJOHN Re. 17,199
FLIPPER FOR STRAIGHT SIDE BEADS
4 Sheets-Sheet 1
Original Filed June 19, 1925
Fig. 1
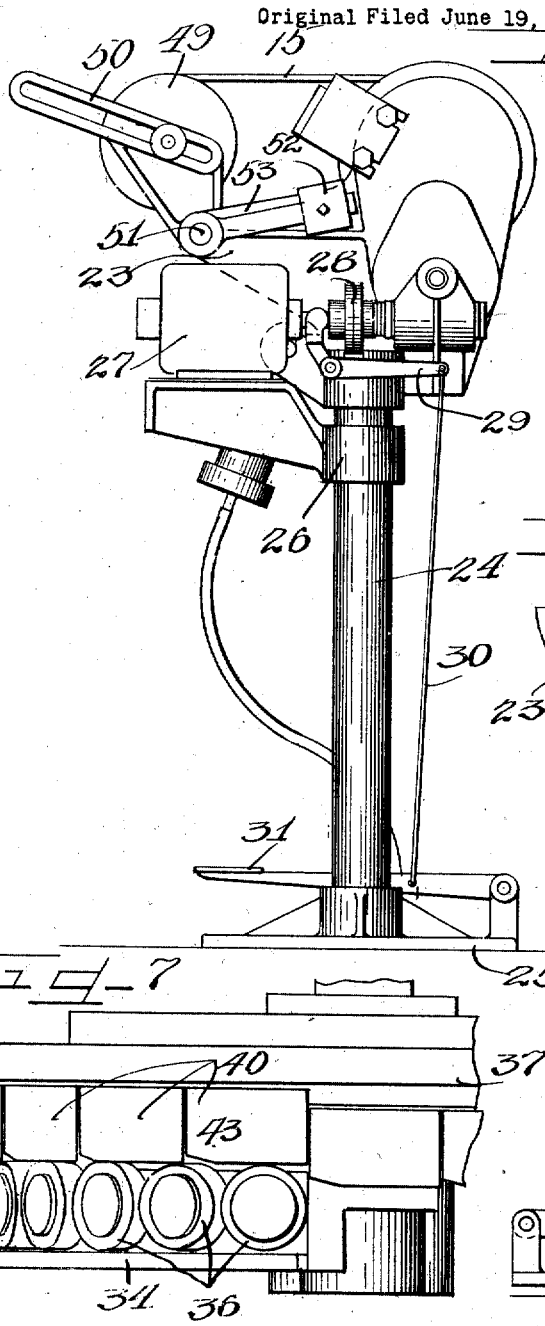
Fig. 3
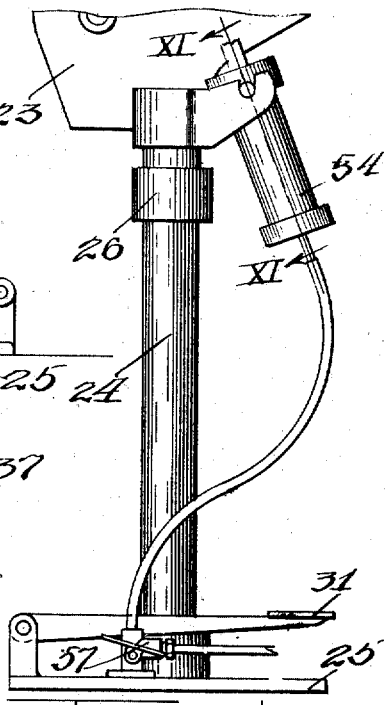
Fig. 7
Inventor
John Jennejohn.
by Chas. W. Hills
Attys Jan. 22, 1929. J. JENNEJOHN Re. 17,199

FLIPPER FOR STRAIGHT SIDE BEADS

4 Sheets-Sheet 2

Original Filed June 19, 1925

Inventor
John Jennejohn.
Charles Hill
by Attys.

Jan. 22, 1929. J. JENNEJOHN Re. 17,199
FLIPPER FOR STRAIGHT SIDE BEADS
4 Sheets-Sheet 3
Original Filed June 19, 1925
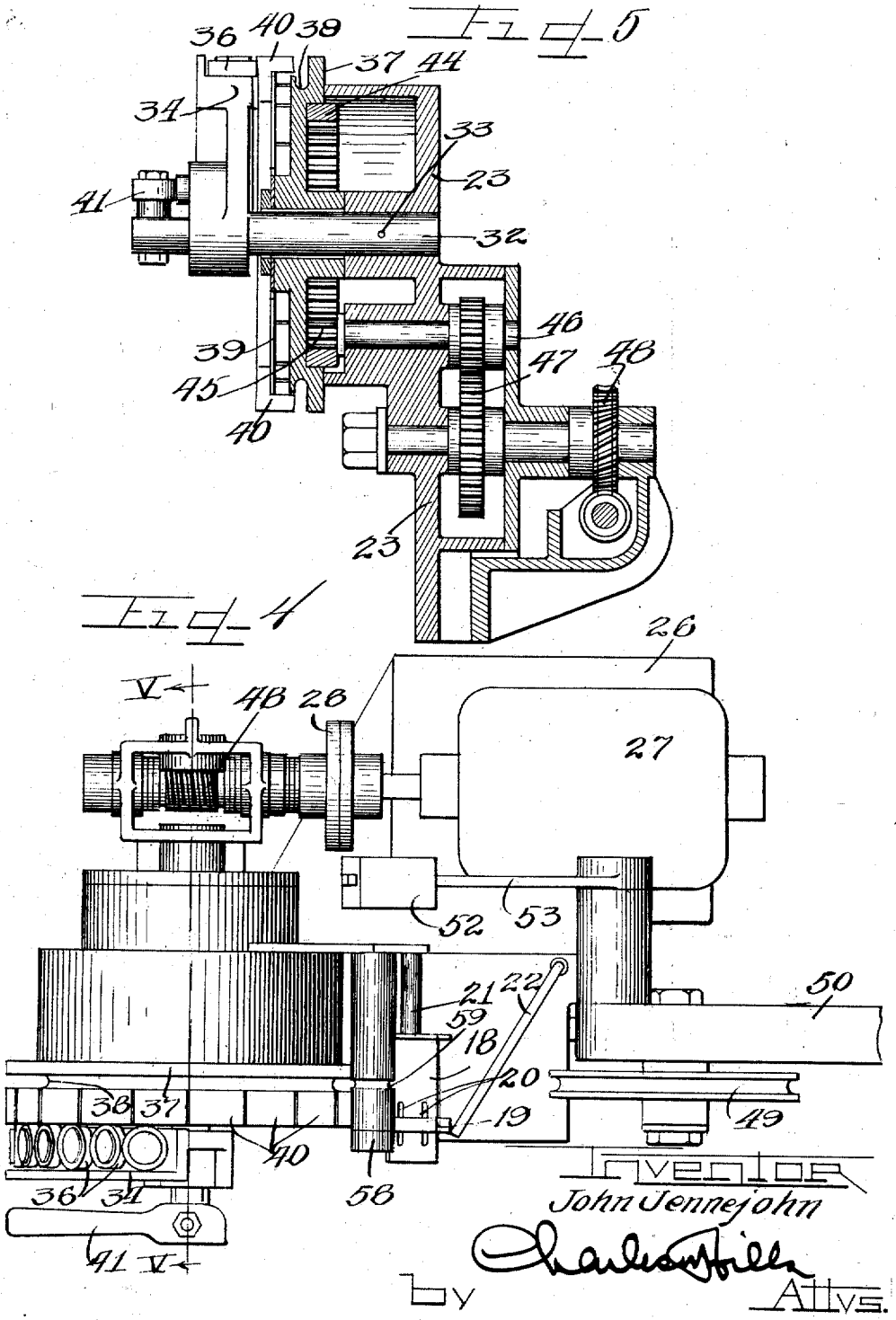

Jan. 22, 1929. J. JENNEJOHN Re. 17,199

FLIPPER FOR STRAIGHT SIDE BEADS

4 Sheets-Sheet 4

Original Filed June 19, 1925

Inventor
John Jennejohn.
Charles W. Hills.
By Attys

Reissued Jan. 22, 1929. Re. 17,199

UNITED STATES PATENT OFFICE.

JOHN C. JENNEJOHN, OF CUDAHY, WISCONSIN, ASSIGNOR TO UTILITY MANUFACTURING CO., OF CUDAHY, WISCONSIN, A CORPORATION OF WISCONSIN.

FLIPPER FOR STRAIGHT-SIDE BEADS.

Original No. 1,602,158, dated October 5, 1926, Serial No. 38,202, filed June 19, 1925. Application for reissue filed October 5, 1928. Serial No. 310,651.

This invention relates to a device for covering round or irregular sections of wire or other articles, with particular reference to shaping a flipper strip about a bead core or wire, either in one continuous ring or in long lengths.

It is an object of this invention to provide an improved machine for covering bead cores or the like wherein the edges of the wrapping strip lap to form an outstanding ridge with the edges offset or even as desired.

It is also an object of this invention to provide a segment wheel or former adapted to be collapsed over the core or article to be wrapped to press the fabric tightly therearound, either in a circumferential wrap or with a projecting edge as in bead flipping strips. A pressure plate actuated by a cam serves to sequentially operate the segments of the wheel as they revolve into position.

It is another object of this invention to provide an idler wheel parallel with the former wheel for tensioning beads when formed as an endless circle. This idler wheel is preferably mounted on a slotted arm to allow for suitable adjustment for different diameter bead rings, and the arm is pivoted and actuated by a fluid cylinder to tension the bead.

Other and further important objects of this invention will be apparent from the disclosures in the specification and the accompanying drawings.

This invention (in a preferred form) is illustrated in the drawings and hereinafter more fully described.

On the drawings:

Figure 1 is a rear elevation of a device embodying a preferred form of this invention.

Figure 3 is an elevation of the stand and with Figure 2 forms a complete front elevation.

Figure 4 is a top plan view of the device.

Figure 5 is a section on the line V—V of Figure 4.

Figure 7 is an enlarged fragmentary plan view of the segmental wheel and operating mechanism, showing the action thereof.

As shown on the drawings:

Figure 2:
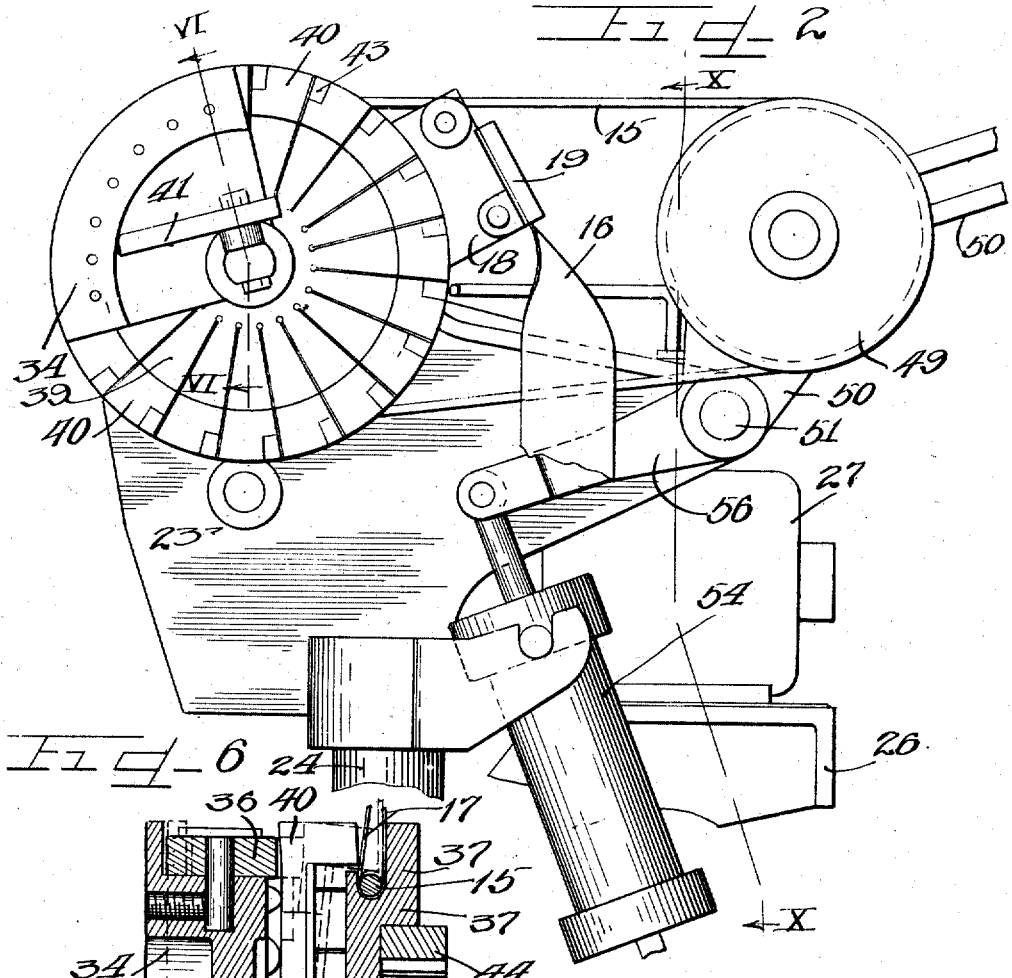
Figure 2 is an enlarged front elevation of the operating mechanism.
Figure 6:
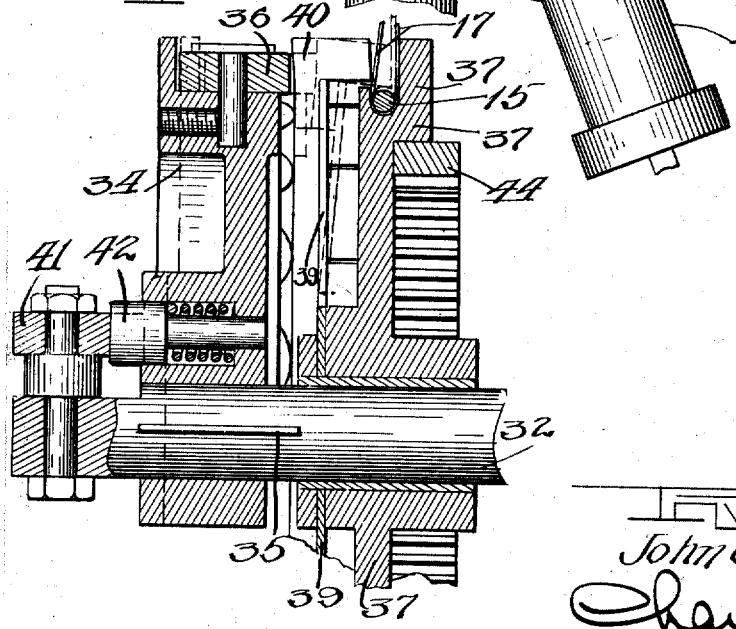
Figure 6 is a fragmentary section on the line VI—VI of Figure 2.
Figure 9:
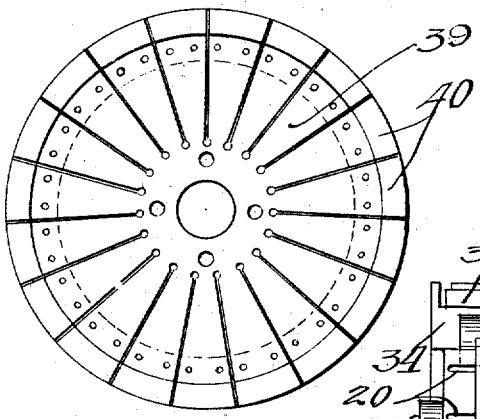
Figure 9 is a detail view of the segment wheel.
Figure 8:
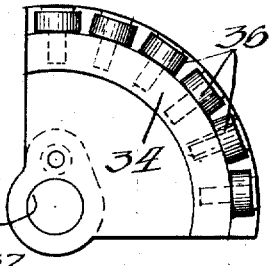
Figure 8 is a rear view of the roller plate.
Figure 10:
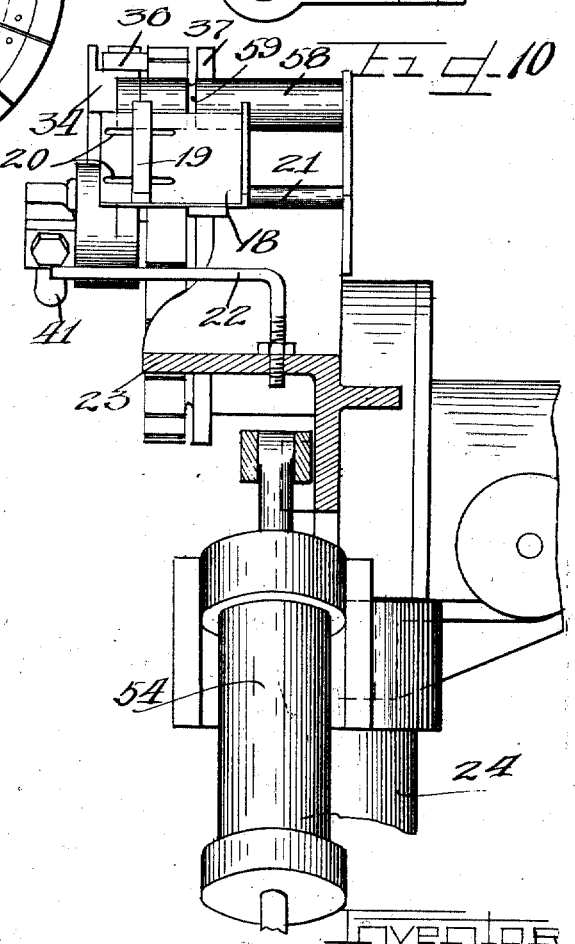
Figure 10 is a section on the line X—X of Figure 2.
Figure 11:
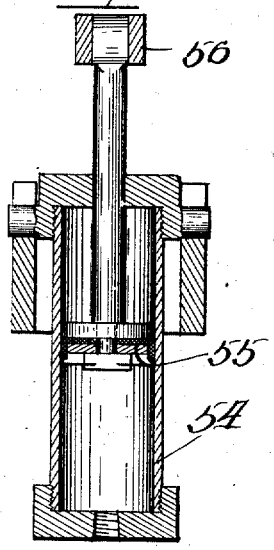
Figure 11 is an enlarged section on the line XI—XI of Figure 3.

The specific embodiment chosen for illustration shows a continuous cable bead 15 for pneumatic tires, about which is to be wrapped a flipper strip 16 with the edges 17 tacked together in substantially the plane of the cable bead. More generally this apparatus is intended to wrap a covering material over a core of more or less irregular outline, with the core either forming an endless loop or as long continuous lengths. The covering material may be applied as a complete circumferential wrap or with projecting edges as for the bead fillers chosen for illustrative purposes. An adjustable feed table is provided for the different widths of material used with circumferential wraps as compared with projecting lapped edges, and also to regulate the overlap or stagger of the edges, in the latter case. This feed table 18 is best shown in Figure 10 where one guide 19 for the wrapper fabric is adjustable as shown by the slots 20. The table as a whole is also adjustable on its supporting arm 21. The fabric is guided to the table by a bent arm 22 which serves to twist the fabric into position as shown in Figure 2.

The machine proper comprises a supporting bracket 23 of a form suitable for mounting the various elements to be described hereinafter. The bracket may be conveniently mounted on a pedestal 24 having a broad foot 25 carrying the operating levers if the machine is to be controlled by the operator's foot. The pedestal also carries a bracket 26 supporting the driving motor 27 which is connected to the operating parts of the machine by a friction clutch 28 operated by the bell crank 29, rod 30 and foot lever 31.

A shaft 32 is fixed at 33 in the bracket 23 and carries a pressure plate 34 slidable lengthwise thereof, but restrained by the key 35 from rotary motion. The pressure plate carries a series of free rollers 36 forming an arc of a circle. Between the roller plate and the bracket 23 is a rotating disc 37 having a peripheral groove 38 to conform to the outline of the inner or lower part of the object to be wrapped. Secured to the disc is a segmental wheel 39 of resilient material, each segment of which carries an outstanding block or shoe 40 adapted to be forced over the peripheral groove 38 when contacted by the rollers 36 to press the wrapping material over the upper or outer surface of the object to be wrapped. The pressure plate is brought into position to act on the segment wheel by a lever cam 41 acting against the spring pressed plunger 42 in the roller plate. Each shoe 40 of the segment wheel is beveled at its leading edge as indicated at 43 to permit the leading roller to depress the segment without shock. Succeeding rollers are so spaced as to prevent release of a segment by one roller before the next one engages the segment.

An internal gear 44 is secured in the back of the disc 37 and driven by a pinion 45 on a shaft 46 which in turn is driven by reduction gearing 47 and worm gearing 48 connected to the friction clutch 28. The particular form of gearing shown is not essential, all that is required is to secure a desired peripheral speed of the disc 37 with a convenient control by the operator.

When using endless bead cores or loops of material to be covered, an idler wheel 49 is provided to tension the same and also to give the disc 37 sufficient driving power on the material. This idler wheel is adjustably mounted in an arm 50 on the shaft 51, which carries a balance weight 52 on another arm 53. This counterbalance is preferably adjusted to overbalance the idler wheel in order that the wheel may normally return to short position to permit change of bead cores after completing the covering operation. The idler wheel is brought into operating or tensioning position by the fluid cylinder 54 and piston 55 acting on the arm 56. A suitable fluid control valve 57 is shown mounted on the pedestal foot to enable the operator to conveniently control the fluid cylinder.

An idler roll 58, having a groove 59 conforming to the shape of the article to be wrapped, is mounted between the feed table and the disc 37 in a position to bring the wrapping material or flipper strip up beneath the article to be wrapped, such as the cable bead shown. This roll serves to roll the flipper strip into contact with the lower part of the cable bead, the segment wheel then turning one side of the flipper strip over the top of the cable bead into contact with the other edge of the strip. It will thus be evident that the width and positioning of the flipper strip will determine whether a lap or a circumferential wrap is formed and the feed table will also determine the stagger of the ends of the strip.

The operation is as follows: When wrapping tire beads, a flipper strip 16 is placed on the feed table with its leading edge over the idler roll 58, and the bead core 15 placed around the disc 37 and idler wheel 49. Stepping on the control valve 57 operates the cylinder 54 to tension the bead core and forces it into the grooves in the roll 58, wheel 49 and disc 37. The disc 37 carrying the segment wheel (39) is then caused to rotate by depressing the foot lever 31 controlling the clutch 28. At the same time, the lever cam 41 is operated to bring the pressure plate into operative position. The tension applied to the bead core serves to force the core and the fabric down into the grooves of the roll 58 and disc 37, binding the tacky fabric to the lower part of the core and drawing the same onto the disc, where successive segment shoes 40 are depressed by the roller plate to force one upstanding edge of the fabric over the top of the bead core into contact with the other edge of the fabric.

It will be evident that the outstanding edges of the flipper strip will be vertical and tangent to the side of the core if a vertical wall is used on the disc 37 as shown. To get other angles of projection, the profile of the disc wall and segment shoes are correspondingly inclined. If the flipper strip is to be radial with respect to the bead core a slight change in the profile of the disc groove or a duplication of the segment wheel acting on the other side of the bead will accomplish this result.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A machine of the class described comprising means for bringing a bead core and flipper strip together in predetermined relationship, a peripherally grooved disc adapted to advance said bead core and strip, driving means for said disc, a segment wheel secured to the disc, each segment of which carries a block adapted when forced toward the disc to press one edge of the flipper strip over the bead core, and means adapted to sequentially depress the wheel segments to force the blocks into operating position.

2. A machine of the class described comprising means for bringing a bead core and flipper strip together in predetermined relationship, a peripherally grooved disc adapted to advance said bead core and strip, driving means for said disc, a segment wheel secured to the disc, each segment of which carries a block adapted when formed toward the disc to press one edge of the flipper strip over the bead core, a former adapted to sequentially actuate said block carrying segments and means for advancing said former into operative contact with the segment wheel.

3. A machine of the class described comprising means for bringing a bead core and flipper strip together in predetermined relationship, a peripherally grooved disc adapted to advance said bead core and strip, driving means for said disc, a segment wheel secured to the disc, each segment of which carries a block adapted when forced toward the disc to press one edge of the flipper strip over the bead core, means adapted to sequentially depress the wheel segments to force the blocks into operating position, and means adapted to tension the bead core during the covering operation.

4. In a machine of the class described, a rotating grooved disc adapted to receive a portion of an article to be wrapped, a segment wheel secured to the side thereof, blocks on the ends of each segment adapted to be passed over the article within the disc groove, and means adapted to bear against said segments to force the blocks over the article to be wrapped.

5. In a machine of the class described, a rotating grooved disc adapted to receive a portion of an article to be wrapped, a segment wheel secured to the side thereof, blocks on the ends of each segment adapted to be passed over the article within the disc groove, means adapted to bear against said segments to force the blocks over the article to be wrapped, and means for tensioning the article during the wrapping operation.

6. In a machine of the class described, a rotating grooved disc adapted to receive a portion of an article to be wrapped, a segment wheel secured to the side thereof, blocks on the ends of each segment adapted to be passed over the article within the disc groove, a plate adapted to successively force the segments and blocks over the disc and means for resiliently holding said plate in operative position.

7. In a bead wrapping machine, means adapted to bring the wrapping material into contact with the bead, a series of resilient fingers having shoes adapted to be sequentially shifted to fold the wrapping material over the remaining surface of the bead, and means for forcing said fingers and shoes into operating position.

8. In a bead wrapping machine, means for bringing the wrapping material into contact with the bead, a plurality of sequentially operated elements for folding the wrapping material over the bead and means common to said elements for sequentially pressing them into cooperation with said bead.

9. In a bead wrapping machine, a support for the bead to be covered with a wrapping material a plurality of pressure elements arranged in a circle for progressively applying the wrapping material to the bead on said support means for causing a relative movement between the bead and said elements and other means for sequentially operating said elements.

10. In a wrapping machine, means for bringing a wrapping material into contact with the article, a plurality of sequentially operable elements arranged in a circle for progressively applying the wrapping material to the article, and means for progressively moving said elements into cooperation with said wrapping material.

11. In a machine of the class described, a disc for receiving a portion of an article to be wrapped, means comprising a segmental wheel associated with said disc and means for actuating the segments of said wheel to bring pressure to bear on the article being wrapped on said disc.

12. In a machine of the class described, a disc for receiving a portion of an article to be wrapped, means comprising a segmental wheel associated with said disc, means for actuating the segments of said wheel to bring pressure to bear on the article being wrapped on said disc, and means for sequentially operating the segments of said wheel to cause them to progressively press the wrapping material on the article on said disc.

13. In a bead wrapping machine, a support for the bead to be covered with the wrapping material, a plurality of pressure elements arranged in a circle for progressively applying the wrapping material to the bead on said support, and means for sequentially engaging and pressing said elements into cooperation with said bead.

14. In a bead wrapping machine, a support for the bead to be covered with the wrapping material, a plurality of pressure elements arranged in a circle for progressively applying the wrapping material to the bead on said support, and means for sequentially pressing said elements into cooperation with said bead, said means including a pressure plate comprising a sector of a circle having roller means for engaging said elements and means for causing a relative movement between said plate and said wheels.

15. In a wrapping machine of the class described, a plurality of wheels mounted upon a common axis, one being formed to carry the article being wrapped, and the other having radial pressure elements, and means for progressively moving said elements into cooperation with the article on said first wheel.

16. In a bead wrapping machine, a support for the bead to be covered with the wrapping material, a plurality of pressure elements arranged in a circle for progressively applying the wrapping material to the bead on said support, means for sequentially pressing said elements into cooperation with said bead, said means including a pressure plate comprising a sector of a circle having roller means for engaging said elements and means for causing a relative movement between said plate and said wheels, and manually operable means for moving said pressure plate into cooperation with said elements.

17. In a bead wrapping machine, a support for the bead to be covered with the wrapping material, a plurality of pressure elements arranged in a circle for progressively applying the wrapping material to the bead on said support, means for sequentially pressing said elements into cooperation with said bead, said means including a pressure plate comprising a sector of a circle having roller means for engaging said elements and means for causing a relative movement between said plate and said wheels, and manually operable means for moving said pressure plate into cooperation with said elements, said means comprising a resiliently mounted element and a cam for depressing said element.

18. In a bead wrapping machine, a wheel for supporting a portion of the bead, means for applying a wrapping to said bead on said wheel, and means for automatically tensioning the bead, comprising a wheel engaging said bead, a lever for forcing the wheel into engagement with the bead and fluid operated means for exerting a pressure on said lever.

19. In a bead wrapping machine, a wheel for supporting a portion of the bead, means for applying a wrapping to said bead on said wheel, means for automatically tensioning the bead, comprising a wheel engaging said bead, a lever for forcing the wheel into engagement with the bead and fluid operated means for exerting a pressure on said lever, and means for counteracting the pressure of said fluid means so as to counterbalance said latter wheel.

20. In a bead wrapping machine, means for bringing the wrapping material into contact with the bead, a plurality of sequential operated elements for folding the wrapping material over the bead, means common to said elements for exerting a pressure on said elements, and an internal gear drive for said latter means.

In testimony whereof I have hereunto subscribed my name at Cudahy, Wis., county of Milwaukee.

JOHN C. JENNEJOHN.